United States Patent
Doddaiah et al.

(10) Patent No.: US 11,593,267 B1
(45) Date of Patent: Feb. 28, 2023

(54) MEMORY MANAGEMENT BASED ON READ-MISS EVENTS

(71) Applicant: Dell Products L.P., Round Rock, TX (US)

(72) Inventors: Ramesh Doddaiah, Westborough, MA (US); Malak Alshawabkeh, Franklin, MA (US); Rong Yu, West Roxbury, MA (US); Peng Wu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/513,026

(22) Filed: Oct. 28, 2021

(51) Int. Cl.
*G06F 12/0871* (2016.01)

(52) U.S. Cl.
CPC .............................. *G06F 12/0871* (2013.01)

(58) Field of Classification Search
CPC ............. G06F 12/0871; G06F 12/0862; G06F 2212/6024
See application file for complete search history.

(56) References Cited

U.S. PATENT DOCUMENTS

| | | | | |
|---|---|---|---|---|
| 6,047,363 A * | 4/2000 | Lewchuk | ............ | G06F 12/0862 711/213 |
| 9,477,407 B1 * | 10/2016 | Marshak | ................ | G06F 3/061 |
| 2009/0094391 A1 * | 4/2009 | Yim | ..................... | G06F 12/0804 710/52 |

* cited by examiner

*Primary Examiner* — Chie Yew
(74) *Attorney, Agent, or Firm* — Krishnendu Gupta; Nikhil Patel (57) ABSTRACT

Aspects of the present disclosure relate to asynchronous memory management. In embodiments, an input/output (IO) workload is received at a storage array. Further, one or more read-miss events corresponding to the IO workload are identified. Additionally, at least one of the storage array's cache slots is bound to a track identifier (TID) corresponding to the read-miss events based on one or more of the read-miss events' two-dimensional metrics.

18 Claims, 5 Drawing Sheets

MEMORY MANAGEMENT BASED ON READ-MISS EVENTS

BACKGROUND

A storage array also called a disk array, is a data storage system for block-based storage, file-based storage, or object storage. A storage array can use multiple drives (e.g., spinning hard disk drives (HDDs) or solid-state drives (SSDs)) to store a large amount of data. Further, a storage array can include memory that stores quick access copies of data stored in a drive. Additionally, a storage array can include a management system that manages the array's disk and memory resources.

SUMMARY

Aspects of the present disclosure relate to asynchronous memory management. In embodiments, an input/output (IO) workload is received at a storage array. Further, one or more read-miss events corresponding to the IO workload are identified. Additionally, at least one of the storage array's cache slots is bound to a track identifier (TID) corresponding to the read-miss events based on one or more of the read-miss events' two-dimensional metrics.

In embodiments, each read-miss event's space-dimensional metrics can be determined. Additionally, each read-miss event's time-dimensional metrics can be determined. Further, the space-dimensional metrics and the time-dimensional metrics can define each read-miss event's two-dimensional metrics In embodiments, a frequency and number of IO operations associated with each storage array extent can be tracked In embodiments, storage array extents can be provisioned with one or more IO density-related parameters.

In embodiments, the storage array extents can be provisioned with at least one IO density-related parameter.

In embodiments, read-miss events associated with at least one extent's neighboring storage tracks can be determined.

The IO density's statistical mean and standard deviation across all the storage array extents can be identified in embodiments. Further, a probability of a future IO operation's relationship with the extent can be based on the determined read-miss events of the extent's neighboring storage tracks.

In embodiments, each storage array extent's IO can be compared to the IO's statistical mean and standard deviation across all the storage array extents. Further, based on the comparison, a binding probability of each storage array extent can be increased or decreased.

In embodiments, an async bit can be established in at least one or more of the storage array extent's record flags. Additionally, the async bit of each storage array extent can be set in response to binding a cache slot to each TID related to each storage array extent's related read-miss event.

In embodiments, a number of read-hits associated with each storage array extent having the async bit set during a time window can be monitored. Additionally, an async hit percentage can be determined over one or more time windows. Each storage array extent's binding can also be released or maintained. The release or maintenance of a subject extent can include comparing the async hit percentage and a threshold async hit percentage.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

In some circumstances, a storage array can experience input/output (IO) workloads that include more frequent requests for certain data than other data stored on the array's storage drives. For example, a bank's array can experience workloads associated with a stock trading company's checking/savings accounts more frequently during daytime hours than at night. In addition, because storage disks have slower performance speeds than memory (e.g., cache memory), a storage array can use a memory management controller to copy frequently requested data from the storage drives to one or more cache memory slots.

Current memory management controllers use one or more machine learning (ML) engines that attempt to anticipate future data request frequencies by monitoring an access frequency of each storage drive's address spaces. However, address space monitoring techniques require significant memory and processing resources. Furthermore, such techniques still yield many read-misses (i.e., the ML engines did not accurately predict the access frequencies of some of the storage drive's address spaces).

Accordingly, aspects of the present disclosure relate to techniques that significantly reduce a storage array's read-miss events. In embodiments, the techniques can include analyzing read-miss event metrics and binding cache memory resources based on the analysis described in greater detail herein.

Figure 1:
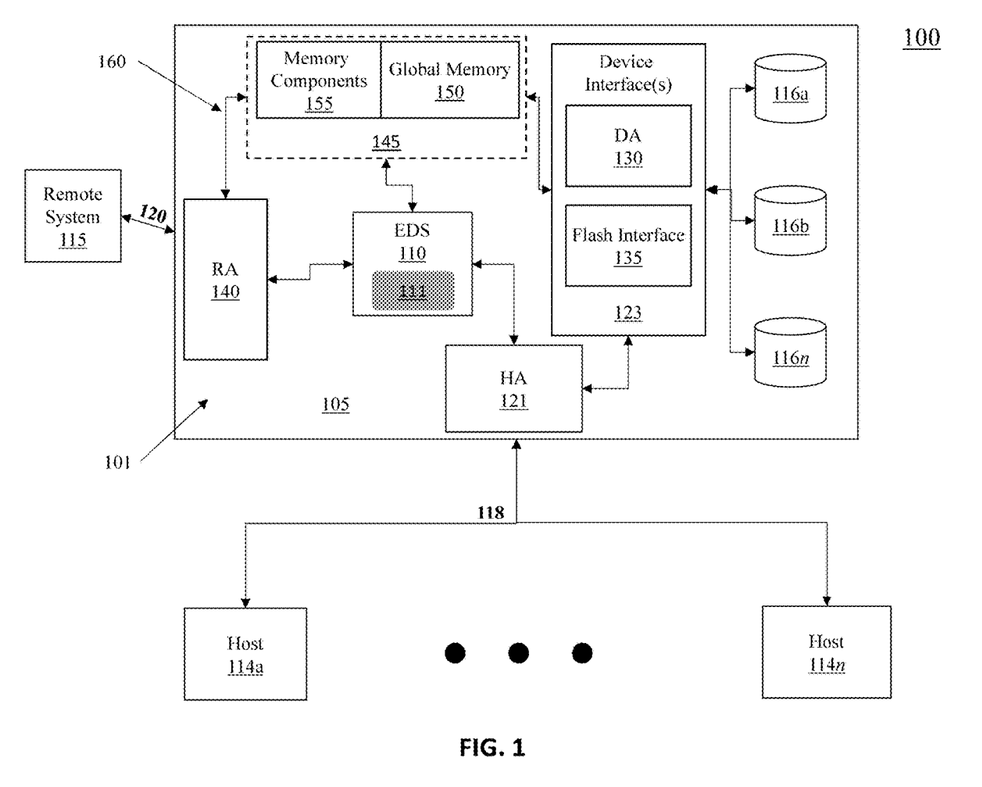
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114*a-n* can define a first communication network 118. Further, the first network's topology can have the hosts 114*a-n* and the array 105 physically co-located or remotely located from one another. Likewise, the array 105 and a remote system 115 can define a second communication network 120. Additionally, the array's RA 140 can manage communications between the array 105 and an external storage system (e.g., remote system 115) using the networks 118, 120. The networks 118,120 can be a wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The networked devices 105, 114a-n, 115, and the like can connect to the networks 118, 120 via a wired/wireless network connection interface, bus, data link, and the like. Further, the networks 118, 120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more of the hosts 114a-n can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116a-n, the array's memory 145 can have different storage performance capabilities.

In embodiments, a service level agreement (SLA) can define at least one Service Level Objective (SLO) the hosts 114a-n require from the array 105. For example, the hosts 115a-n can include host-operated applications that generate or require data. Moreover, the data can correspond to distinct data categories, and thus, each SLO can specify a service level (SL) for each category. Further, each SL can define a storage performance requirement (e.g., a response time and uptime).

In embodiments, the HA 121 can present the hosts 114a-n with logical representations of slices or portions of the array's physical storage devices 116a-n. For example, a logical unit number (LUN) or virtual storage volume can logically represent a collection of addresses spaces from one or more storage devices 116a-n. Further, a track identifier (TID) can logically represent each address space of a LUN. In example embodiments, each TID can logically represent a physical storage track unit. Accordingly, the hosts 114a-n can include at least one TID in a metadata field of each IO request sent to the array 105. As such, the HA 121 can direct IO requests by reading the TIDs from each IO request's metadata fields. In addition, the HA 121 can also create a searchable data structure, mapping logical storage representations to their related physical storage address spaces.

In embodiments, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs). The EDS 110 can also include a memory management controller (MMC) 111 that can adjust the array's memory allocations using one or more temporal and spatial IO-related metrics described in greater detail herein.

Figure 2:
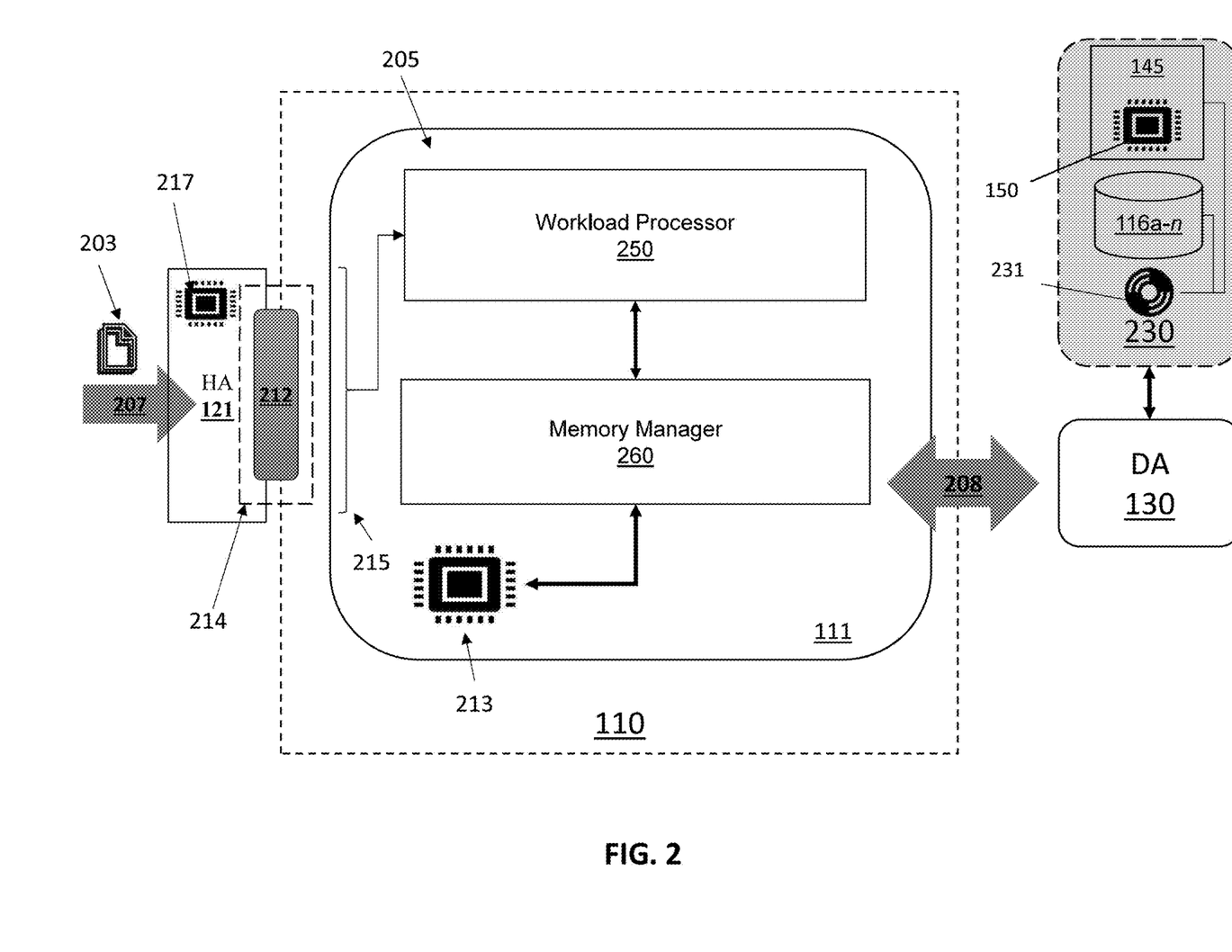
FIG. 2 is a block diagram of an array's resources manager in accordance with embodiments of the present disclosure.

Regarding FIG. 2, the EDS 110 includes an MMC 111 with one or more elements 205 (e.g., software or hardware elements) that perform at least one memory management operation. For example, the MMC 111 can analyze each of the array's read-miss time and space dimensions. Specifically, the MMC can perform memory management operations that reduce read-miss event occurrences based on the analysis.

In embodiments, one or more of the MMC's elements 205 can reside in one or more of the array's other components 101. Further, MMC 110 and its elements 205 can be any commercially available processor, such as an Intel-based processor or graphical processing unit (GPU). Additionally, one or more of the MMC's internal communication channels 215 can communicatively couple the elements 205. The communication channels 311 can include Fibre channels, internal busses, or communication modules.

In embodiments, the array 105 can receive an IO workload 207. The 10 workload can include one or more IO requests 203 sent from one or more of the hosts 114a-n of FIG. 1. The array 105 can receive the IO requests 203 via an HA (e.g., HA 121 of FIG. 1) residing on or emulated by a board 215 residing on one of the array's engines 212. For example, an IO request can include routing information such as a LUN and TID in, e.g., its metadata. Further, the HA 121 can expose one or more of its ingestion ports (not shown). The HA 121 can associate a set of the ports to each logical storage representation (e.g., TIDs and LUNs) it provides to the hosts 114a-n. Accordingly, the HA 121 can maintain, in its local memory 217, a searchable data structure that associates each logical storage representation with internal process routing details. As such, the HA 121 can search the data structure to route an IO request to its target destination immediately.

In embodiments, the controller 110 can include a workload processor 250 that analyzes the workload 207 and the IO requests 203. Further, the analyzer 305 can include logic or circuitry configured to analyze the IO workload 207 and its related IO requests 203. The analysis can include identifying the workload 207 or each IO request's characteristics. For example, an IO request can include metadata that can provide IO characteristic data, including one or more IO types, data track related to the data involved with each IO, time, performance metrics, and telemetry data.

Additionally, the workload processor 250 can monitor and analyze metrics related to IO read-misses. For example, the workload processor 250 identifies whether an IO read request's corresponding data can be read from a copy stored in global memory 150 or from one of the storage drives 116a-n. Accordingly, the workload processor 250 can flag a read-miss event if an IO read request's target data must be read from one of the storage devices 116a-n rather than from the global memory 150. Furthermore, the processor 250 can further maintain an IO read-miss log of each read-miss event in the controller's local memory 213. In embodiments, the global memory 150 can comprise cache memory with one or more cache slots that store copies of a subset of data stored in the storage drives 116a-n.

In other embodiments, the workload processor 250 can dynamically monitor the array's storage resources 230, such as the array's storage devices 116a-n and global memory 150 to identify read-miss events. For example, the storage resources 230 can have storage or memory portions (e.g., slices, sectors, and the like) with corresponding physical address space identifiers (IDs). For each data copy residing in a cache memory slot, the processor 250 can map the cache slot's ID to a corresponding storage device's address space ID. The processor 250 can generate a memory read-miss log, identifying each storage device's address space ID associated with the read-miss. The processor 250 can store the memory read-miss log in the controller's local memory 213. By maintaining a memory read-miss event log, the processor 250 can identify a frequency and pattern associated with each read-miss event. Using this analysis, the workload processor 250 can advantageously reduce the resources it requires. Specifically, by limiting its monitoring to storage drive read accesses, the processor 250 does not waste resources analyzing IO requests that are read-hits.

In embodiments, the array 105 can include daemons 230 that communicatively couple to the array's storage resources 230 via, e.g., a Fibre channel. Each daemon 230 can record its related storage resource's read/write activity in an activity log. The activity log can include device characteristics, read/write data type, storage/memory slot size, read/write performance (e.g., response time), SL requirement, telemetry data, among other event-related metadata.

Further, the controller 110 can include a memory manager (MM) 260 with a time-space logic/circuitry configuration. The MM 260 can analyze each read-miss log to identify temporal and spatial characteristics of each read-miss event. Using the temporal and spatial characteristics, the MM 260 can determine the probability of future read-miss events occurrences, including the target storage device's physical address space IDs. Further, the MM 260 can bind cache slots to the predicted target address space IDs based on the anticipated read-miss occurrences. As a result, the MM 260 can significantly reduce read-miss events by binding the cache slots, reducing response times and array resource consumption. As such, the array 105 can allocate freed resources to perform other storage-related tasks.

Figure 3:
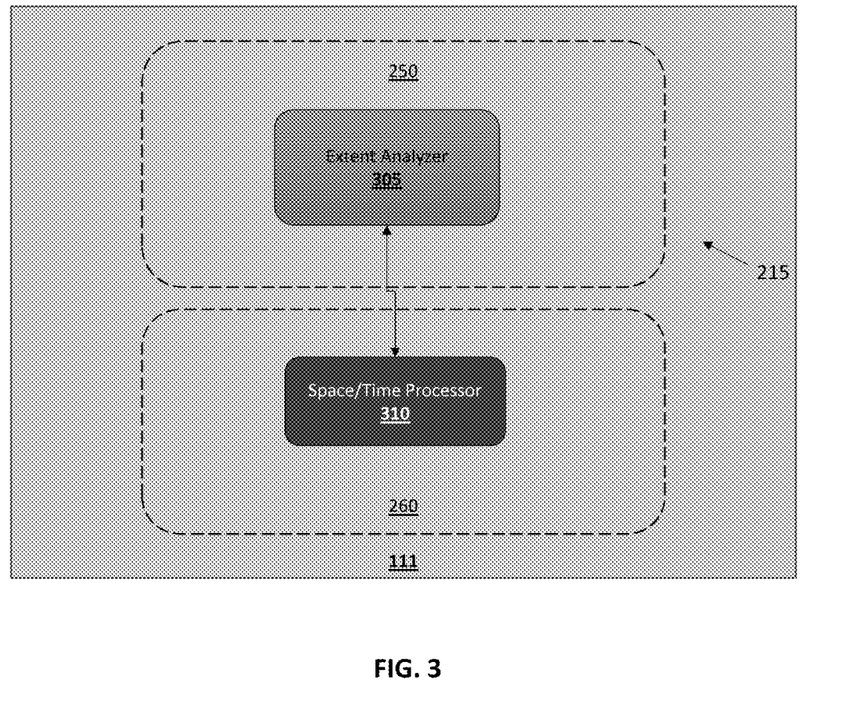
FIG. 3 is a block diagram of a memory manager in accordance with embodiments of the present disclosure.

Regarding FIG. 3, the workload processor 250 can include an extent analyzer 305. The extent analyzer 305 can implement an extended Fully Automated Storage Tiering (e-FAST) protocol to add time/spatial fields to an extent, TID, and LUN metadata parameters. For example, the analyzer 305 can analyze the IO and memory read-miss logs to determine temporal and spatial characteristics associated with each read-miss event. Further, the analyzer 305 can insert temporal and spatial characteristic information into the time/spatial metadata fields.

In embodiments, the event analyzer 305 can generate one or more read-hit snapshots for each cache slot bound to a physical storage space by periodically analyzing each daemon's activity log. The event analyzer 305 can store the snapshots and activity logs in the local memory 213. In other embodiments, the daemons 331 can randomly or periodically issue activity log reports to the event analyzer 305 according to a daemon reporting schedule. The reporting schedule can specify each daemon's duration, start time, or end time of each event collection period. For example, the event analyzer 305 can establish the reporting schedules based on patterns of the historical/current workloads, each workload's IO requests, and storage resources' activity levels. As such, each snapshot defines amounts of read-hits over a time window (e.g., defined by a duration between snapshots) for each extent.

Further, the analyzer 305 can determine an IO associated with each host assign identify each physical extent's address block related to a read-miss event. For example, each extent can be a set of consecutive virtual address blocks of a virtual disk (e.g., LUN). However, each extent can map to a non-adjacent physical storage drive extent. Accordingly, the TSD processor 310 can calculate IO density as a function of the number of IO requests per extent.

In embodiments, the memory manager 260 can include a space/time-dimension (TSD) processor 310 that dynamically binds or unbinds cache memory slots to/from a physical storage address space.

For example, the TSD processor 310 can analyze the read-hit snapshots to generate read-hit heatmaps. Accordingly, the read-hit heatmaps define a number of each extent's read-hits and a total number of read-hits over a time window. Using the determined read-hits, the TSD processor 310 can further determine each extent's read-hit percent of the total read-hits during any time window. Further, the TSD processor 310 can compare each extent's read-hit percent to a threshold read-hit percent. If the extent's read-hit percent is less than the threshold, the TSD processor 310 can unbind the cache slot from the extent's corresponding physical address space.

Further, the TSD processor 310 can calculate an extent's importance level, defining a probability the extent will be associated with a future read-miss event based on the extent's IO. For example, the TSD processor 310 can identify the IO densities of an extent's neighboring extents. Additionally, the TSD processor 310 can calculate a statistical mean and standard deviation of IO densities. The processor 310 can calculate the mean and standard deviation using an extent sample that includes the extent and its neighbors or all extents. In addition, the TSD processor 310 can establish a threshold IO using the IO statistical mean and standard deviation. In response to each read-miss event, the TSD processor 310 can compare the related extent's IO with the threshold. If the extent's IO is greater than a threshold, the TSD processor can increase the importance leveling of the extent.

In further embodiments, TSD processor 310 assigns a temporal weight to each event's percent read-hit rate per time window. In addition, the TSD processor 310 can assign a spatial weighting to each event's importance level per time window. Using the temporal weight, percent read-hit rate, spatial weight, and importance level, the TSD processor 310 can calculate a time/space probability of an extent being associated with a read-hit. Further, the TSD processor 310 can compare the time/space probability to a threshold to either bind or unbind related cache memory slots to/from a physical storage address space.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described by this disclosure.

Figure 4:
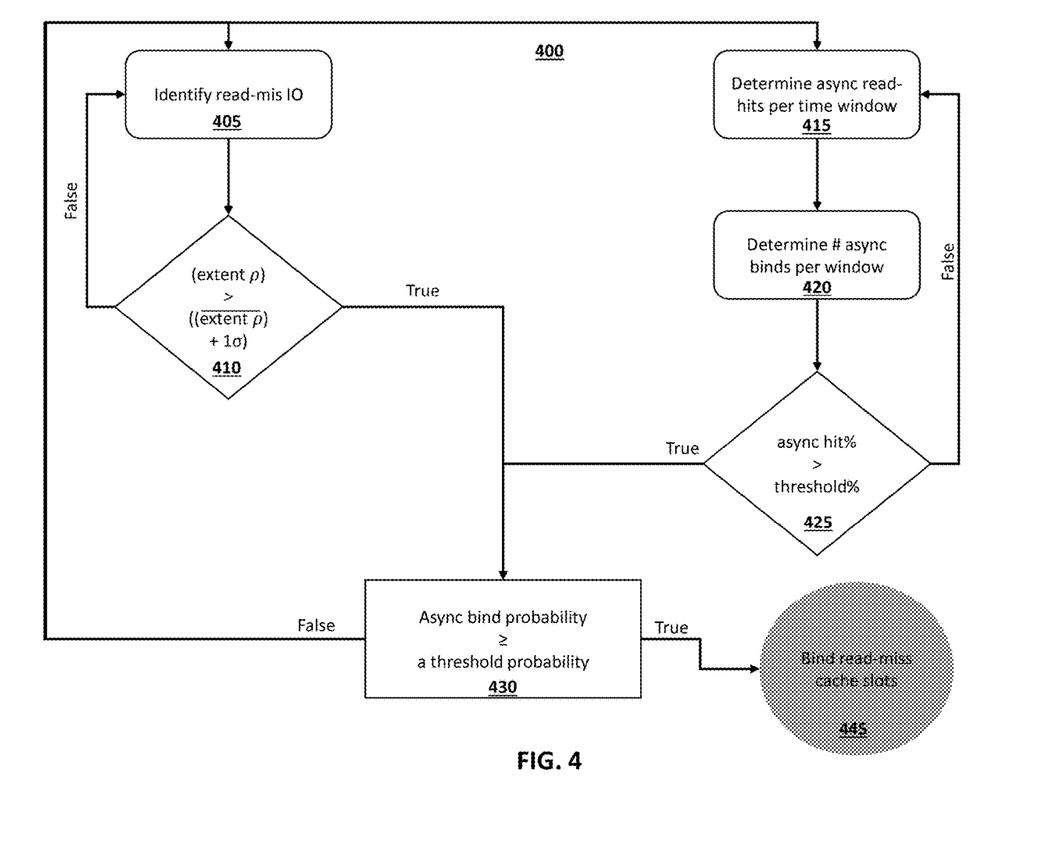
FIG. 4 is a flow diagram of a method for binding track identifiers to cache memory slots in accordance with embodiments of the present disclosure.

Regarding FIG. 4, a method 400 can be executed by, e.g., an array's EDS processor or any of the array's other components (e.g., the EDS processor 110 or components 101, respectively, of FIG. 1). Method 400 describes steps for managing the array's global memory (e.g., memory 150). At 405, the method 400 can include identifying one or more read-miss IO requests. The method 400, at 410, can also include determining if an extent's IO (extent p) is greater than a mean density of the extent's neighboring extents. If the method, at 410, returns a positive result, the method 400 can include continuing to step 430. Otherwise, the method 400, at 410, can include returning to step 405. Additionally, the method 400, at 415, can include determining the number of asynchronous ("async") read-hits during one or more temporal intervals. Further, the method 400, at 420, can include determining the number of async binds per time window. Additionally, the method 400, at 425, can include determining if an async read-hit percent is greater than a threshold read-hit percent. If the method 400, at 425, returns a positive result, the method 400 can include continuing to step 430. Otherwise, the method 400 can include returning to step 415. At 430, the method 400 can include determining where an async bind probability is greater than or equal to a threshold probability. If the method 400, at 430, returns a positive result, the method 400 can include continuing to step 445. Otherwise, the method 400, at 430, can include continuing to steps 405 and 415. At 445, the method 400 can include binding the read-miss IO request's related LUN to a cache slot.

It should be noted that each step of the method 400 can include any combination of techniques implemented by the embodiments described herein.

Figure 5:
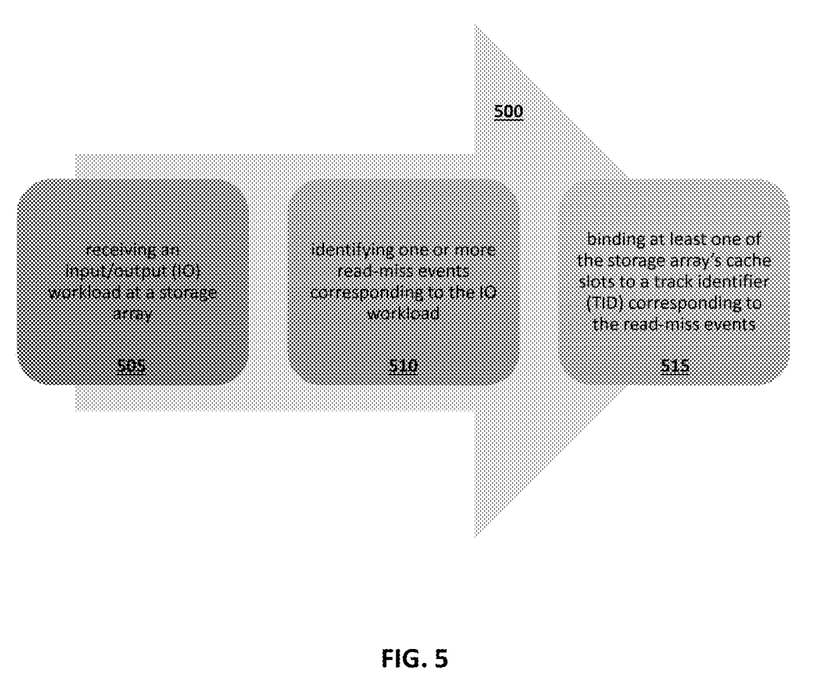
FIG. 5 is a flow diagram of a method for managing memory allocations in response to identifying read-miss events in accordance with embodiments of the present disclosure.

Regarding FIG. 5, a method 500 can be executed by, e.g., an array's EDS processor or any of the array's other components (e.g., the EDS processor 110 or components 101, respectively, of FIG. 1). The method 500 describes steps for binding one or more of the array's cache memory slots. At 505, the method 500 can include receiving an input/output (IO) workload at a storage array. The method 500, at 510, can also include identifying one or more read-miss events corresponding to the 10 workload. Finally, at 515, the method 500 can further include binding at least one of the storage array's cache slots to a track identifier (TID) corresponding to the read-miss events based on one or more of the read-miss events' two-dimensional metrics.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a back-end component can also implement the above-described techniques. The back-end component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts and combinations of the listed features.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method, comprising:
   receiving an input/output (TO) workload at a storage array;
   identifying two or more read-miss events corresponding to the TO workload; and
   binding at least one of the storage array's cache slots to a track identifier (TID) corresponding to the read-miss events based on two or more of the read-miss events' two-dimensional metrics.

2. The method of claim 1, further comprising:
   determining each read-miss event's space-dimensional metrics; and
   determining each read-miss event's time-dimensional metrics;
   wherein the space-dimensional metrics and the time-dimensional metrics define each read-miss event's two-dimensional metrics.

3. The method of claim 1, further comprising:
   tracking a frequency and number of IO operations associated with each storage array extent.

4. The method of claim 1, further comprising:
   provisioning storage array extents with one or more IO density-related parameters.

5. The method of claim 4, further comprising:
   determining the read-miss events are associated with at least one extent's neighboring storage tracks.

6. The method of claim 5, further comprising:
   identifying a statistical mean and standard deviation of the TO density across all the storage array extents; and
   determining a probability of a future TO operation's relationship with the extent is based on the determination that the read-miss events are associated with the at least one extent's neighboring storage tracks.

7. The method of claim 6, further comprising:
   comparing each storage array extent's IO with the statistical mean and standard deviation of the IO across all the storage array extents;
   increasing or decreasing a binding probability of each storage array extent based on the comparison.

8. The method of claim 1, further comprising:
   setting an async bit of each storage array extent in response to binding a cache slot to each TID related to each storage array extent's related read-miss event.

9. The method of claim 8, further comprising:
   monitoring a number of read-hits associated with each storage array extent having the async bit set during a time window;
   determining an async hit percentage over one or more time windows; and
   releasing or maintaining each storage array extent's binding, wherein the release or maintenance of a subject extent includes comparing the async hit percentage and a threshold async hit percentage.

10. An apparatus having a processor and memory configured to:
    receive an input/output (TO) workload at a storage array;
    identify two or more read-miss events corresponding to the TO workload; and bind at least one of the storage array's cache slots to a track identifier (TID) corresponding to the read-miss events based on two or more of the read-miss events' two-dimensional metrics.

11. The apparatus of claim 10, further configured to:
determine each read-miss event's space-dimensional metrics; and
determine each read-miss event's time-dimensional metrics;
wherein the space-dimensional metrics and the time-dimensional metrics define each read-miss event's two-dimensional metrics.

12. The apparatus of claim 11, further configured to:
track a frequency and number of IO operations associated with each storage array extent.

13. The apparatus of claim 10, further configured to:
provision storage array extents with one or more IO density-related parameters.

14. The apparatus of claim 13, further configured to:
determine the read-miss events are associated with at least one extent's neighboring storage tracks.

15. The apparatus of claim 14, further configured to:
identify a statistical mean and standard deviation of the TO density across all the storage array extents; and
determine a probability of a future TO operation's relationship with the extent is based on the determination that the read-miss events are associated with the at least one extent's neighboring storage tracks.

16. The apparatus of claim 15, further configured to:
compare each storage array extent's IO with the statistical mean and standard deviation of the IO across all the storage array extents;
increase or decrease a binding probability of each storage array extent based on the comparison.

17. The apparatus of claim 10, further configured to:
set an async bit of each storage array extent in response to binding a cache slot to each TID related to each storage array extent's related read-miss event.

18. The apparatus of claim 17, further configured to:
monitor a number of read-hits associated with each storage array extent having the async bit set during a time window,
determine an async hit percentage over one or more time windows; and
release or maintain each storage array extent's binding, wherein the release or maintenance of a subject extent includes comparing the async hit percentage and a threshold async hit percentage.

* * * * *